United States Patent [19]

Munguia

[11] Patent Number: 5,000,504
[45] Date of Patent: Mar. 19, 1991

[54] SWIVEL SEAT ATTACHABLE TO A TRUCK TAILGATE

[76] Inventor: Benjamin R. Munguia, 8001 W. Tidwell 806, Houston, Tex. 77040

[21] Appl. No.: 512,479

[22] Filed: Apr. 23, 1990

[51] Int. Cl.⁵ .............................................. B60N 1/00
[52] U.S. Cl. .................................. 296/65.1; 296/57.1; 297/252
[58] Field of Search ............... 296/63, 64, 65.1, 57.1, 296/50, 61, 62, 68; 297/252; 248/503.1

[56] References Cited

U.S. PATENT DOCUMENTS

| 324,196 | 8/1885 | Walling | 296/68 |
|---|---|---|---|
| 560,752 | 5/1896 | Prator et al. | 296/62 X |
| 2,702,076 | 2/1955 | Beardsley et al. | 297/252 |
| 2,749,969 | 6/1956 | Tatter | 297/252 X |
| 2,836,223 | 5/1958 | Kent | 297/252 |
| 3,821,825 | 7/1974 | Bailey . | |
| 3,853,369 | 12/1974 | Holden | 296/62 |
| 3,961,809 | 6/1976 | Clugston | 296/62 X |
| 4,611,852 | 9/1986 | Filer | 297/252 X |
| 4,679,840 | 7/1987 | Fry . | |
| 4,805,952 | 2/1989 | Coleman | 296/65.1 |
| 4,846,487 | 7/1989 | Criley | 296/62 X |
| 4,848,821 | 7/1989 | Llewellyn | 296/62 |

Primary Examiner—Dennis H. Pedder
Assistant Examiner—Joseph D. Pape

[57] ABSTRACT

A swivel seat structure is detachably mounted on the tailgate of a pick-up truck, such that a person can sit down while viewing outdoor activities (e.g. watching outdoor fireworks or fishing at a river bank). A mounting bracket is provided for easily and quickly attaching the seat structure to the tailgate without drilling holes or otherwise defacing the tailgate structure.

5 Claims, 1 Drawing Sheet

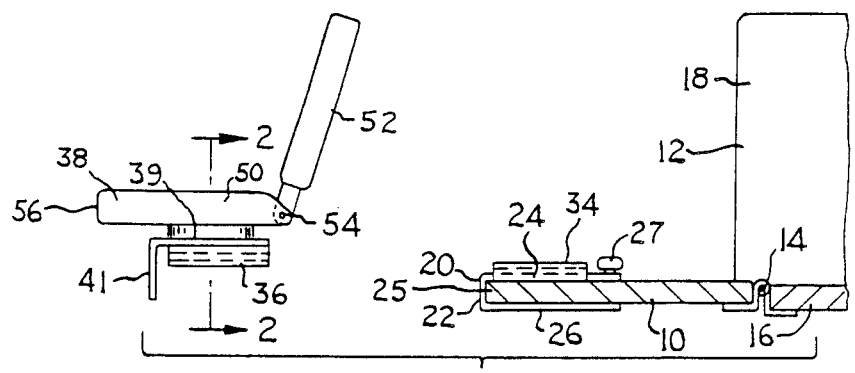
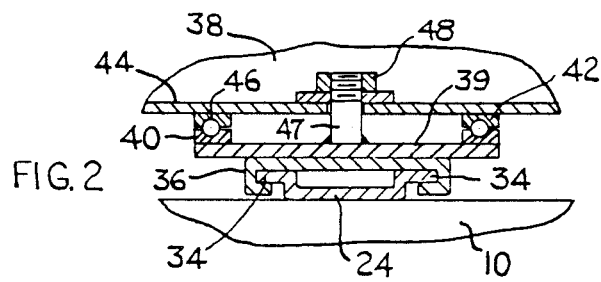
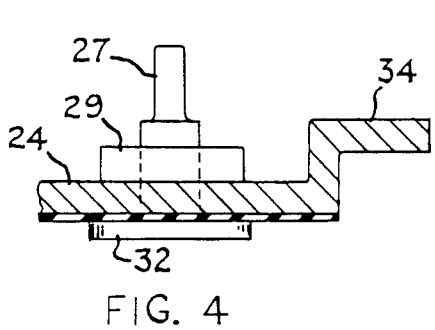
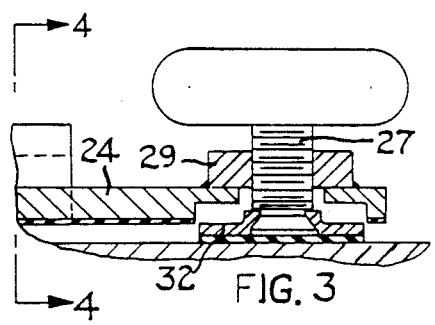

SWIVEL SEAT ATTACHABLE TO A TRUCK TAILGATE

BACKGROUND AND SUMMARY OF THE INVENTION

This invention relates to a swivel seat structure adapted to be detachably mounted on the tailgate of a pick-up truck. The seat structure can be used for fishing, with the truck backed up to the water's edge. Also, the seat structure can be used at the beach by a person wishing to view the beach area without actually venturing onto the beach surface. The seat structure could be used in other situations, e.g. for viewing outdoor fireworks displays or baseball games, or for tailgate parties at football games.

In one form of the invention a U-shaped mounting bracket is adapted to be slipped over the free edge of a tailgate at the rear end of a pick-up truck; a set screw is provided for clamping the bracket to the tailgate. With the tailgate swung down to its horizontal position the bracket is adapted to slidably receive a swivel seat structure. A track element on the underside of the seat structure can be slipped onto an upper surface of the mounting bracket for moving the seat structure into a position above the tailgate surface.

The hardware is designed so that the front edge of the seat structure extends beyond the free edge of the tailgate. Therefore, a person sitting in the seat structure can swivel the seat from side to side without having his legs bumping against the tailgate.

The mounting structure for the seat is relatively compact, such that two swivel-type seats can be detachably mounted on a single tailgate, if so desired. The mounting brackets do not interfere with normal swinging motions of the tailgate. Therefore, the mounting brackets can be left on the tailgate when the associated seat structures are removed for storage.

THE DRAWINGS

FIG. 1 is an exploded side elevational view of a seat structure and mounting bracket constructed according to the invention.

FIG. 2 is a sectional view taken on line 2—2 in FIG. 1, with the seat structure installed on the mounting bracket.

FIG. 3 is a fragmentary enlarged sectional view of a structural detail used in the FIG. 1 mounting bracket.

FIG. 4 is a sectional view taken on line 4—4 in FIG. 3.

DESCRIPTION OF A PREFERRED EMBODIMENT OF THE INVENTION

FIG. 1 shows in schematic fashion the tailgate 10 of a pick-up truck 12. A hinge structure 14 swingably connects the tailgate to the bed area 16 of the truck, such that the tailgate can assume a horizontal prone position, as shown, or an upright position closing the space between the side walls 18 of the truck cargo box.

My invention includes a U-shaped bracket 20 that comprises a relatively short web wall 22 and two elongated legs 24 and 26. The space between the two legs 24 and 26 is designed to be slightly greater than the thickness of tailgate 10, such that the bracket can be slipped over edge 25 of the tailgate to the installed position of FIG. 1.

FIG. 3 illustrates a manually-operably set screw mechanism for clamping bracket 20 onto the tailgate. The mechanism includes a set screw 27 threaded through a nut 29 that is welded or otherwise affixed to the upper surface of the bracket leg 24. At its lower end the set screw rotatably carries a circular pad 32. The lower face of this pad has a rubber sheet thereon to prevent any marring of the tailgate surface. The surfaces of bracket 24 and 26 may also have rubber elements thereon to avoid marring the tailgate surface, and also to prevent any noise associated with rattling (while the truck is in motion).

The desired clamping action of the bracket on the tailgate is achieved by turning screw 27 so that pad 32 applies pressure against the tailgate surface. Bracket leg 24 is thus forced away from the tailgate surface. Bending stresses generated in leg 24 cause the bracket to be rigidly clamped to tailgate 10. The bracket is preferably formed of a relatively heavy gage steel strap material that can deflect enough to generate the necessary clamping force.

Bracket leg 24 has two laterally-projecting flanges 34 spaced above the general plane of the leg, such that a track element 36 can be slidably moved onto and along the flanges. Track element 36 is carried on the undersurface of a seat structure designated generally by numeral 38. As shown in FIG. 1, the seat structure and associated track element 36 are detached from bracket 20. The seat structure can be moved rightwardly so that the track element 36 is slidably telescoped onto bracket flanges 34, as shown in FIG. 2. Track element 36 has two facing channel sections that can slidably fit onto flanges 34.

A plate 39 is affixed to track element 36 to form a base for swivel mounting of the seat structure 38. A downturned section 41 of plate 39 limits the motion of track element 36 onto bracket leg 24. The swivel mechanism comprises a circular raceway 40 affixed to plate 39, a second circular raceway 42 affixed to a plate 44, and a ring of anti-friction balls 46 rollably arranged in the raceways. The swivel mechanism may be held together by means of a stud 47 projecting from the plate 39, and a nut 48 located above plate 44. Plate 44 forms the bottom wall of seat structure 38.

The axis of stud 47 intersects the longitudinal centerline of track element 36, such that forces generated by the weight of the person seated on the seat structure 38 are applied approximately evenly around the stud 47 axis. The stud is located on the rotational (swivel) axis defined by anti-friction balls 46.

Seat structure 38 can take various structural configurations. The seat portion 50 and back rest portion 52 of the seat structure are preferably padded for comfort purposes. A pivot structure 54 interconnects the seat portion and back rest portion, such that the back rest portion can take various different inclination, between an erect position and a reclined position. A leg rest structure (not shown) can be attached to the front edge 56 of seat portion 50.

As shown in FIG. 1, front edge 56 of seat portion 50 is located to the left of wall section 41. When the seat structure is installed onto bracket 20 seat edge 56 will project beyond the edge of tailgate 10, such that the person occupying the seat can swivel the seat from side to side without having his legs bump into the edge 25 of the tailgate.

The drawings show a single bracket 20 and a single seat structure 38 mounted on tailgate 10. However the conventional tailgate is wide enough to accommodate two seat structures in side-by-side relation. Each seat structure will have its own mounting bracket 20.

The drawings necessarily show one particular form of the invention It will be appreciated that the invention can be practiced in various forms and configurations.

I claim:

1. A swivel seat in association with a pick-up truck having a swing-down tailgate, the improvement comprising a U-shaped bracket that includes a web, a first leg and a second leg extending from said web; said bracket mounted on said tailgate with the two legs thereof extending along opposite side surfaces of the tailgate, and the web in near proximity to an edge of the tailgate; an internally threaded member carried on said first leg remote from the web; a manually-operable set screw extending through the internally threaded member; pressure-applying means on said set screw engaging a tailgate surface for stressing the first leg away from the tailgate surface, to thereby anchor the bracket onto the tailgate;
   a track element slidably movable along said first bracket leg when the bracket is installed on the tailgate;
   a seat structure;
   and swivel means interconnecting the track element and seat structure.

2. The swivel seat improvement of claim 1, wherein said pressure-applying means comprises a pad rotatably attached to one end of the set screw.

3. The swivel seat improvement of claim 1, wherein said first leg of the bracket has two laterally-projecting flanges extending therealong; said track element having two facing channel sections which slidably fit onto said projecting flanges.

4. The swivel seat improvement of claim 1, wherein said swivel means comprises a first plate affixed to the track element at a central point therealong, a second plate affixed to the seat structure above the first plate, and a series of anti-friction balls arranged in a circular ring pattern around a central axis extending through the longitudinal centerline of the track element.

5. The swivel seat improvement of claim 1, wherein said seat structure comprises a seat portion (50) and a back rest portion (52); said seat portion having a front edge (56) that projects outwardly beyond the tailgate when the track element is fully inserted onto the first bracket leg.

* * * * *